United States Patent [19]

Mellblom et al.

[11] 4,360,175
[45] Nov. 23, 1982

[54] AIRCRAFT WEATHER VANE MOORING DEVICE

[76] Inventors: Howard M. Mellblom, 3408 Luckie Rd., Cheyenne, Wyo. 82001; John M. Maxwell, 504-C Salem Ct., Cary, N.C. 27511

[21] Appl. No.: 147,938

[22] Filed: May 8, 1980

[51] Int. Cl.³ .............................................. B64F 1/12
[52] U.S. Cl. .................................................. 244/115
[58] Field of Search .................. 244/114 R, 115, 116; 410/1, 2, 102, 156; 188/83, 32; 108/142; 248/349

[56] References Cited

U.S. PATENT DOCUMENTS

| | | | |
|---|---|---|---|
| 698,231 | 4/1902 | Starzman | 188/132 |
| 1,351,931 | 9/1920 | Ullmann | 244/115 |
| 1,781,015 | 11/1930 | Keipp | 108/142 |
| 2,021,886 | 11/1935 | Carpenter et al. | 188/83 |
| 2,483,078 | 9/1949 | Williams | 244/115 |
| 3,497,167 | 2/1970 | Adams et al. | 244/115 |
| 3,567,160 | 3/1971 | Adams et al. | 244/115 |
| 3,567,161 | 3/1971 | Adams et al. | 244/115 |

Primary Examiner—Charles E. Frankfort
Attorney, Agent, or Firm—Gregory J. Nelson

[57] ABSTRACT

An aircraft weather vane and mooring device having a turntable rotatably mounted about a depending central shaft. A friction brake assembly engages the center shaft to prevent rotation of the turntable under normal wind conditions. The turntable comprises a plurality of radially extending crossarms having a low profile configuration. The crossarms are supported for rotation on ground engaging rollers at spaced-apart locations along the crossarms. Weather panels can be detachably secured between adjacent crossarm members.

6 Claims, 11 Drawing Figures

U.S. Patent  Nov. 23, 1982  Sheet 1 of 3  4,360,175
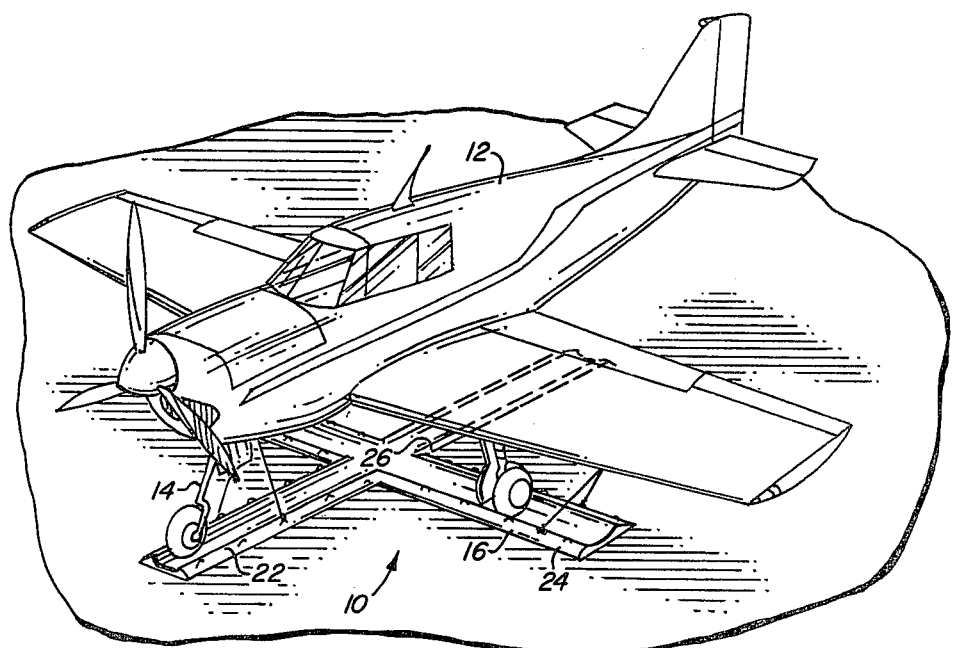
FIG-1
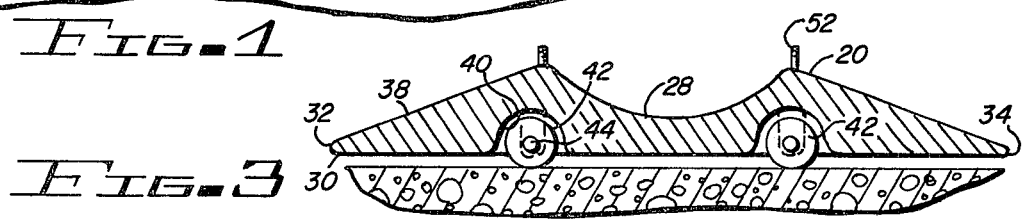
FIG-3
FIG-2
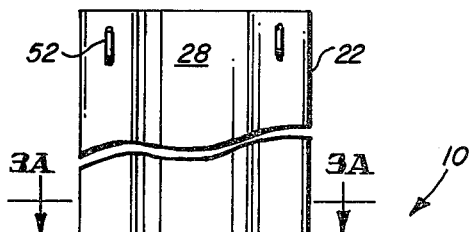
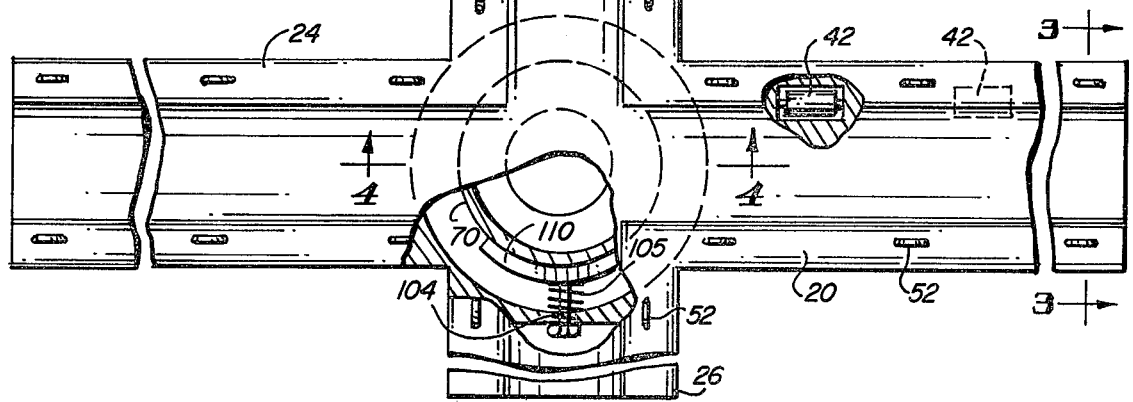
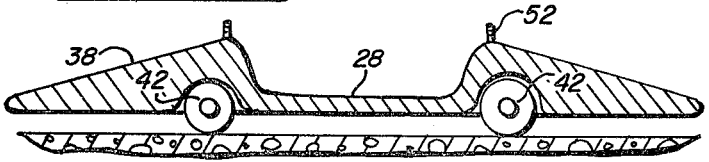
FIG-3A

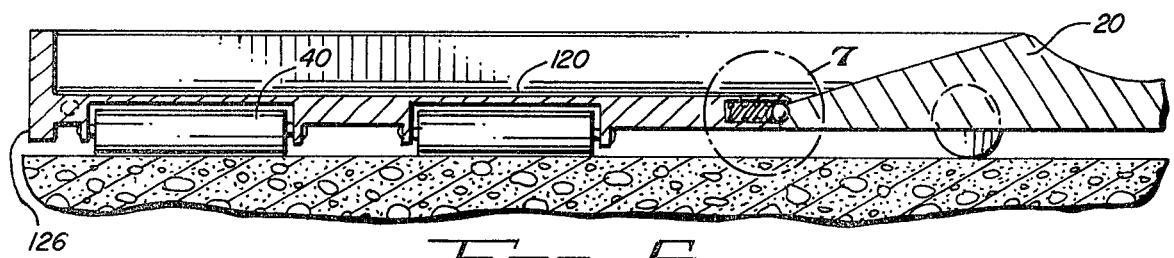
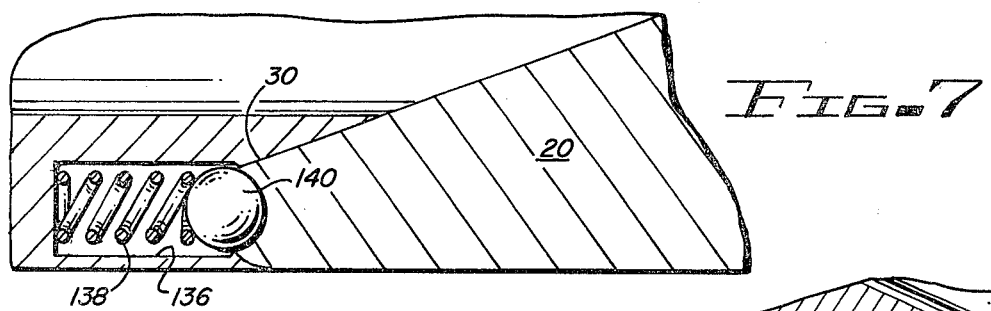
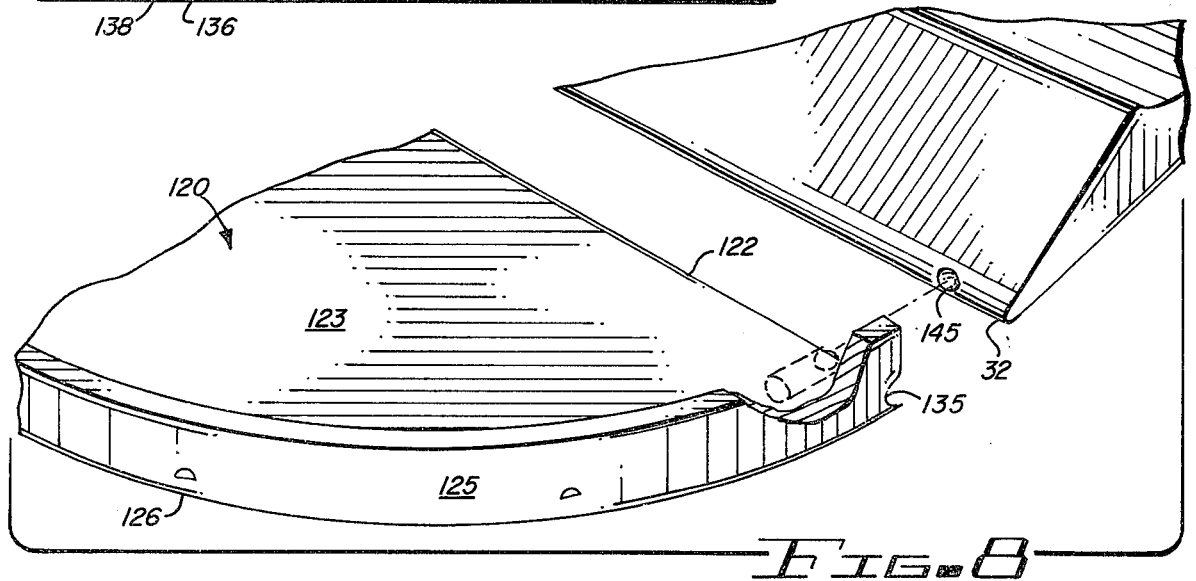
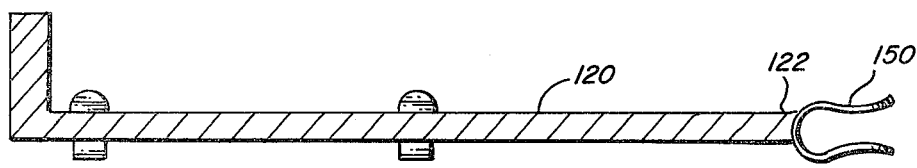
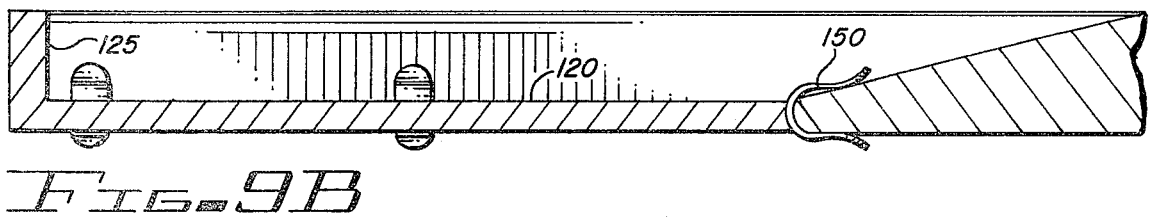

AIRCRAFT WEATHER VANE MOORING DEVICE

The present invention relates to an aircraft mooring device and more particularly to a rotatable mooring device to permit the aircraft to weather vane under the influence of prevailing winds.

It is customary to secure general aviation aircraft by tying or tethering the aircraft to mooring rings on the runway provided for this purpose. Generally aircraft are tied in an orientation headed into the wind to minimize the possibility of wind damage. High winds accompanying storms, hurricanes and other severe weather conditions can cause substantial damage to aircraft as winds are often generated in directions other than the direction in which the tied-down aircraft is headed. Even though a prevailing wind comes principally from one direction, sudden gusts and wind changes damage a plane secured in a fixed position. Accordingly, fixed position tie-down as is commonly practiced for many general aviation aircraft is not satisfactory. As an alternative, aircraft can be maintained in hangars, however, the cost of maintaining an aircraft in a closed hangar is substantial, and in many cases, prohibitive.

In an attempt to meet the problem of damage to tied-down aircraft, several aircraft weather vaning devices can be found in the prior art. These devices generally comprehend a supporting structure rotatable about a vertical axis for receiving an aircraft to be parked. For example, Patent No. 3,497,167 shows an extendable, rotatable support for aircraft having a hydraulic jack for raising or lowering the aircraft carriage assembly relative to the ground level. In operation, the rotatable carriage is lowered to bring the wheel cradles to ground level to position the aircraft on the carriage. The carriage assembly is elevatable by the jack mechanism to raise the cradles supporting the aircraft landing gear a distance of about three inches to permit the aircraft to weather vane.

U.S. Pat. Nos. 3,567,160 and 3,567,161 represent improvements over the tie-down device described above in which the supporting framework rests in a trough so as to be flush with the ground in the lowered position. The framework is elevatable through a hydraulic system to the elevated weather vaning position.

While the devices described above are effective for their intended purposes, they are somewhat complex and expensive to construct. The hydraulic system for elevating the supporting framework and the construction of the supporting framework and trough requires substantial first costs and continued maintenance costs.

Accordingly, there exists a need for an effective aircraft weather vaning mooring device. Briefly, the present invention provides an aircraft weather vaning mooring device having a turntable comprised of a pair of intersecting crossarm supports rotatable on a main shaft depending into a housing embedded in concrete in the runway. The crossarm supports are carried on rollers located on the underside of the supports with the rollers engaging the ground in the tie-down area. The crossarms are configured having concave cradle for receiving the aircraft wheels and are further provided with inclined ramp surfaces at either side of the cradle to enable the aircraft to easily taxi onto the cradle. A friction brake device engages the rotatable main shaft to maintain the crossarms at a fixed or static position at low wind conditions. At higher wind conditions, the wind forces overcome the resistance of the frictional brake to permit the entire crossarm assembly to rotate to prevent wind damage to the aircraft. Removable panels may be inserted between the crossarms and secured to the crossarms in geographical areas where snow accumulation may interfere with rotation of the crossarm assembly.

The above and other objects and advantages of the present invention will become more apparent from the following description, claims and drawings in which:

FIG. 1 is a perspective view of the aircraft weather vane device of the present invention with an aircraft moored to the device;

FIG. 2 is a plan view of the aircraft weather vane device of the present invention;

FIG. 3 is a sectional view of one of the crossarms taken along lines 3—3 of FIG. 2;

FIG. 3A is a sectional view of the other crossarm taken along lines 3A—3A of FIG. 2;

FIG. 6 is a cross-sectional view taken along lines 6—6 of FIG. 5;

FIG. 7 is an enlarged detailed view of the detent as indicated within the dashed circle in FIG. 6;

FIG. 8 is a perspective detailed view of a portion of the covered panel and crossarm; and FIGS. 9A and 9B illustrate an alternate means of attaching the cover panels to the crossarm.

Figure 4:
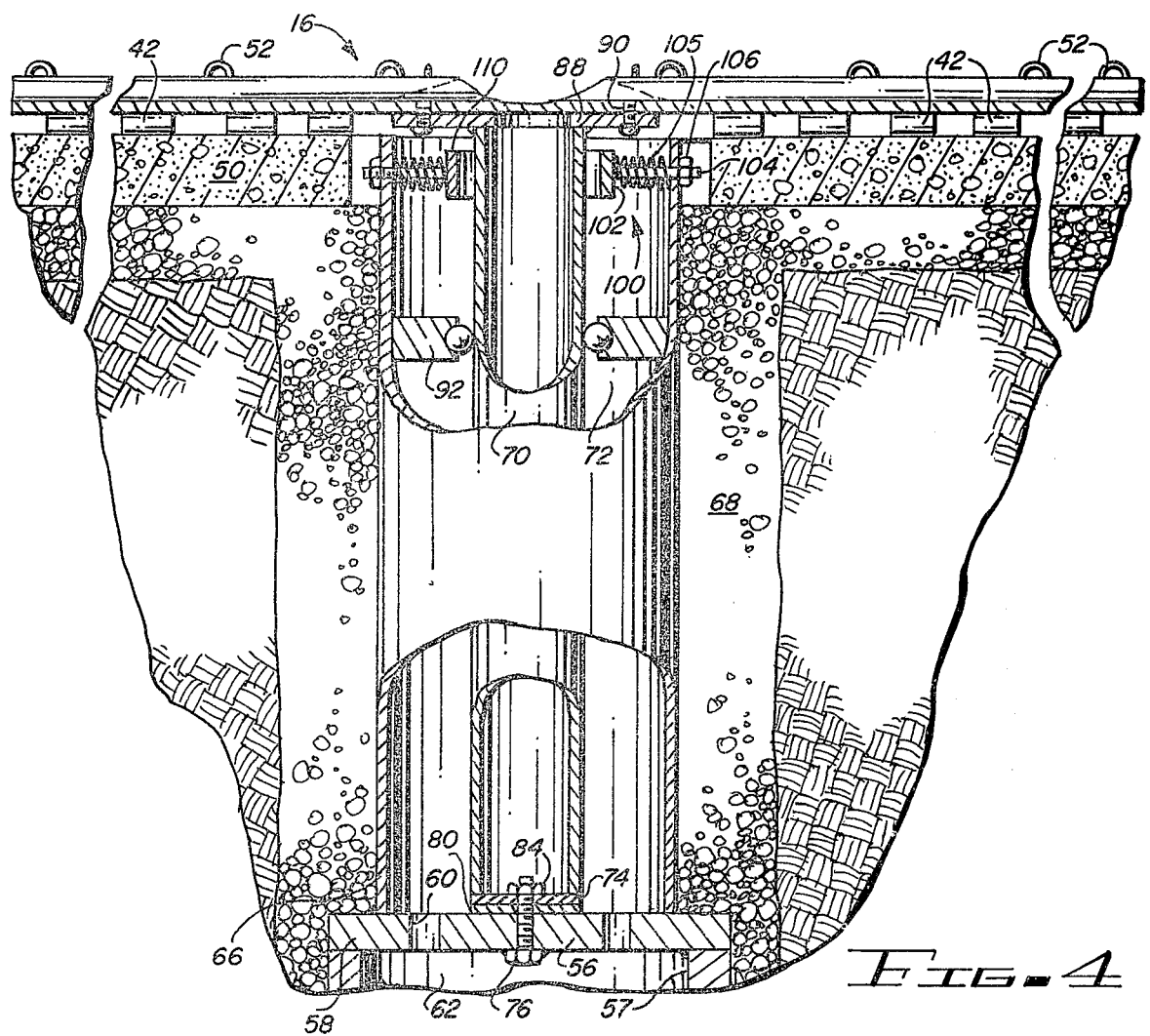
FIG. 4 is a vertical cross-sectional view of the weather vane device of the present invention.
Figure 5:
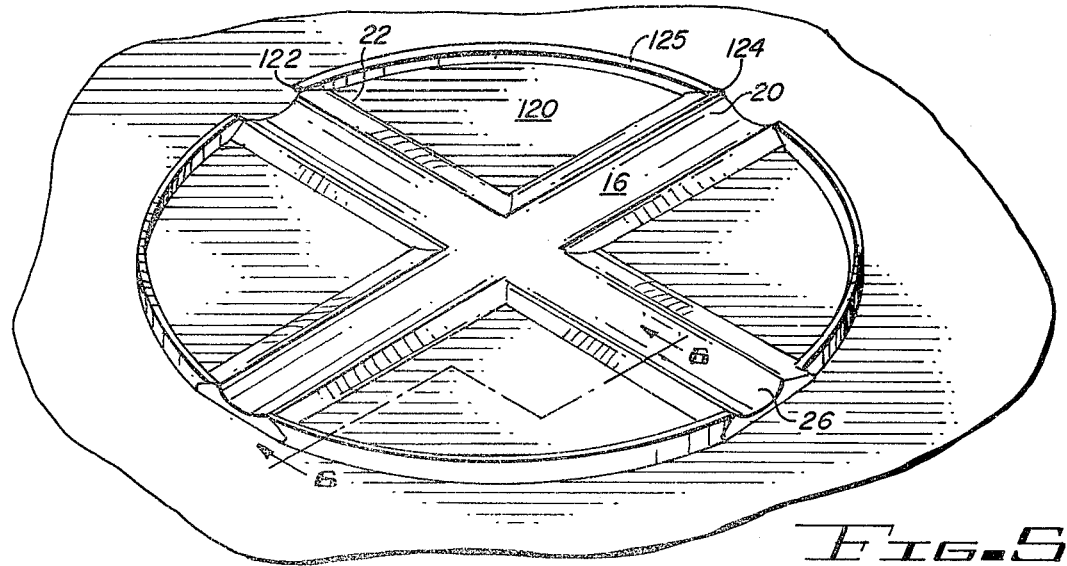
FIG. 5 is a perspective view illustrating the weather vane device of the present invention with cover panels secured in place between the crossarms.

Turning now to the drawings, the weather vane mooring device of the present invention is generally designated by the numeral 10 and is shown in FIG. 1 in connection with an aircraft 12 having a conventional tricycle landing gear 14. The weather vane mooring device of the present invention includes a rotatable turntable 16 comprising a plurality of crossarms 20, 22, 24 and 26 arranged generally at right angles with respect to one another. The length of the crossarms is selected so as to be sufficient to accommodate the transverse and axial spacing between the landing gears as shown. The construction of each of the crossarms 20, 22, 24 and 26 is essentially the same, as best seen in FIGS. 2, 3 and 3A. Each of the crossarms defines a radially extending concave cradle 28. Crossarms 22 and 26 may be provided with a deeper cradle 28 to provide a track for the nose wheel when the aircraft is taxied as seen in FIG. 3A. The underside of the cradle defines a substantially planar surface 30 terminating at opposite edges 32 and 34. An inclined ramp section 38 extends between the outer edges 32, 34 and cradle 28. The purpose of the ramp is to allow the pilot to taxi the main wheels of the aircraft onto the cradle portion of the crossarms 20 and 24 with minimum power.

The lower surface 30 of the crossarms defines a plurality of recesses 40. These recesses are radially spaced-apart along the crossarms and are positioned at either side of the cradle 28 in an area of substantial material thickness. Each of the recesses 40 receives a cylindrical roller 42 having an axis parallel to the radial center line of the respective crossarm. The axle 44 of each roller 40 is positioned within the recess above the plane of the bottom surface 30 so that minimum of ground clearance space 45 exists between the underside 30 of the crossarm and the ground surface 50. The crossarms can be constructed of any material of adequate strength, preferably are formed from suitable structural steel.

A plurality of tie-down rings 52 are located at spaced-apart locations along edges 32 and 34 of the crossarms.

Referring to FIG. 4, it will be seen that the entire turntable assembly is rotatably supported on an assembly embedded in the runway at a suitable location. An excavation is made at a selected location and a base member 56 placed in the excavation. Base member 56 includes a horizontal base plate 58 having a plurality of drain holes 60 communicating with subjacent hollow interior 62 of the base. An outer cylindrical housing 66 is vertically supported on the base plate 58 extending to an elevation approximately corresponding to the surface of runway 50. The area of the excavation surrounding the housing 86 is back filled with concrete or other cementitious material 68.

A shaft 70 is rotatable within well 72 defined within the interior of housing 66. Shaft 70 is shown as a cylindrical pipe having a cap 74 welded to the lower end. A threaded bolt 76 extends axially through plate 58 into well 72. Bearing pad 80 is interposed between plate 58 and cap 74. Nut 84 is secured to the end of bolt 76 at the innerside of cap 74.

A horizontal mounting plate 88 is welded or otherwise secured to the upper end of shaft 70 at a location slightly above the runway 50. Turntable 16, consisting of amrs 20 and 26, is secured to mounting plate 88 by bolts 90. Sealed anti-friction bearings 92 are positioned within well 72 near the upper end to support shaft 70 for rotation.

Friction braking device 100 engages shaft 70 to retain the shaft stationary in low wind conditions. Friction braking device 100 includes a pair of oppositely disposed arcuate brake shoe members 102 carried on mounting bolts 104 extending radially into well 72 through outer housing 66 immediately below the surface of runway 50. The position of the brake shoes 102 relative to shaft 70 can be adjusted at nut 106. A compression spring 105 extends between the housing 66 and the brake shoes to bias the shoes toward the shaft 70. The innerface of arcuate brake shoes 102 are provided with a suitable facing of frictional material such as asbestos or other material commonly used in brake shoe assemblies. The facing may be bonded, riveted or otherwise secured to the shoe assembly.

In some weather conditions and in some geographical areas, it may be desirable to provide cover panels intermediate the crossarms to prevent accumulation of snow which would interfere with rotation of the weather vane mooring device of the present invention. FIGS. 5 through 8 show a plurality of panels 120 which may be interlocked between adjacent crossarms. Each of the panels 120 is in the form of a quadrant having edges 122 and 124 intersecting at right angles and an outer peripheral edge 125. The panels each include a solid cover member 123. The outer peripheral edge 125 preferably has a lip 126 which depends on an elevation almost engaging the ground surface 50 to prevent accumulation of snow beneath the cover panels.

Edges 122 and 124 are each provided with a notch 135 corresponding in configuration to edge or lip 32 and 34 of the crossarms. Thus, the panels can be engaged at the edges 32 and 34 of adjacent crossarms. A detent arrangement, as best seen in FIGS. 6, 7 and 8, further serves to secure the panels in place. A detent is provided at spaced-apart locations along panel edges 122 and 124. The detent comprises a bore 136 which receives compression spring 138. The outer end of compression spring secures a ball member 140. Cooperating recesses 145 are provided in edges 32 and 34 of the crossarms. When the panels 120 are correctly positioned, the ball detent 140 will engage the detent recess 145. Removal requires only a slight manual separation force to disengage the panel from the crossarms.

Panels 120 can be constructed from any suitable material such as wood, metal or fiberglass. The panels will carry a suitable snow load and are adapted to rotate along with the crossarm assembly to prevent accumulation from snow and ice beneath the crossarms which might otherwise impede rotation. Lip 126 is in close proximity to the subjacent ground surface 50. Cover panels 120 are lightweight and can be easily attached after the place is moored to the weather vane mooring device and removed before the aircraft taxi's off the mooring device. FIGS. 9A and 9B show an alternate form of mounting the cover panels 120. In this embodiment, the panel edges 122 and 124 are provided with a generally U-shaped clip 150 which extends substantially along the full length of the edge and oriented with the open end outward and the bight portion secured at the panel edge. The panels 120 are engaged by simply forcing the clips 150 over the peripheral edge 32 as shown in FIG. 9B. The panels are then frictionally engaged to the edges of the crossarms.

The present invention will be more fully understood from the following description of use. The weather vane mooring assembly 10 of the present invention is installed at a suitable location on a parking surface by excavating an installation site. The lower support base 56 is secured at the proper location in the excavation and the outer housing 60 is vertically positioned on the base extending to an elevation corresponding to the surface of the runway. The excavation is backfilled with concrete and the runway surface, which may be asphalt, concrete or similar material, is laid in place. Preferably, the upper surface 50 is terminated at a location spaced away from the housing 66 so access is available to the adjusting nuts for the friction brake device. The vertical shaft member 70 is axially positioned within the well 72 defined by housing 66 and rotatably supported in bearings 92. The friction brake assembly is secured in place with the brake shoe facings 102 engaging the outer cylindrical surface of shaft 66. Turntable 16 is then secured to horizontal mounting plate 88 at the upper end of the rotatable shaft. Nuts 106 of the brake assembly are adjusted to provide the required frictional resistance to rotation of the shaft. Generally the brake assembly 100 is adjusted to prevent rotation of the shaft at wind conditions below about 30 to 40 miles an hour. At higher wind speeds, the forces on the aircraft will overcome the resistance of the brake and allow the moored aircraft to head into the wind by rotating on the rollers to the proper heading position.

The unique crossarm design requires minimum of ground clearance and provides a low profile. This is a significant advantage as the device presents minimum obstruction to ground traffic. In the event a ground vehicle, such as a fuel truck, should inadvertently run over the crossarm, the ramps 38 will prevent any substantial damage and allow the vehicle to pass over the device. Further, the ramps 38 make it easy for the pilot to position the plane on a device. The pilot can simply taxi the aircraft 12 in a proper position with the nose landing gear aligned with crossarms 22 and 26 and the landing gear on the underside of the wings aligned with the opposite crossarms 20 and 24. A relatively low application of power will cause the aircraft to be taxied into the position as shown in FIG. 1 with the landing gears under the wing suitably moored or tethered to the mooring rings 20 as provided. The bearing rollers 42 provide a substantial surface of engagement with the ground. In the event of high winds, squales, gales, hurricanes or the like should materialize, the wind conditions, upon reaching a suitable velocity, will cause the entire assembly to rotate through so the aircraft is always heading into the wind. This weather vaning effect substantially reduces the possibility of damage to the aircraft from storm winds.

In snow conditions, cover panels 120 can be manually secured in place between adjacent crossarms by engaging the edges of the panel at the edges of the crossarms. The detent or snap is all that is required to secure these panels in place. Snow will, thus, be prevented from accumulating between the crossarms which would otherwise prevent rotation of the crossarms. The overhanging outer peripheral lip of the panels serve to prevent accumulation of snow being blown beneath the panels and crossarms.

As apparent from the foregoing, the present invention provides a weather vane mooring device which is effective and simple to install. The device is free of any hydraulic or electrical connections which can fail or require substantial maintenance. The friction braking device serves to effectively restrict the rotation device in normal weather conditions. In high wind conditions, the wind forces will overcome the friction brake and permit the turntable in an aircraft to rotate to face the aircraft into the wind. The low profile crossarm assembly prevents a minimum obstruction to ground traffic and facilitates placement of an aircraft on the crossarms. Further, the mooring device, when used with the removable cover panel is suitable for use even in areas of snow accumulation.

It will be obvious to those skilled in the art to make various changes, alterations and modifications to the invention described herein. To the extent that these various changes, alterations and modifications do not depart from the spirit and scope of the appended claims, they are intended to be encompassed therein.

I claim:

1. An aircraft weather vane and mooring device to receive an aircraft to permit it to weather vane on a surface under the influence of prevailing wind, said device comprising:
   (a) a turntable having a first and second pair of crossarms intersecting and arranged generally perpendicular one to the other, said first pair of crossarms having an upper surface, opposite edges and a bottom having roller means associated therewith for supporting said first pair of crossarms for rotation upon a surface, said upper surface being configured defining a cradle and having a downwardly inclined ramp at each edge between the sides of the cradle and the edge of the crossarms, said second pair of crossarms defining a generally longitudinally extending trough and having a bottom with roller means associated therewith for supporting said second pair of crossarms for rotation upon a surface;
   (b) a shaft depending from said turntable at the intersection of said crossarms and supporting said turntable for rotation; and
   (c) friction braking means associated with said shaft and releasably restraining said shaft against rotation whereby an aircraft can be positioned on said device with the main landing gears positioned in said cradle and whereby upon application of wind forces above a pre-determined velocity said device and the moored aircraft will be caused to rotate into the wind about said shaft and on said surface.

2. The device of claim 1 wherein said braking means comprises a brake shoe member engaging said shaft.

3. The device of claim 2, wherein said brake shoe member further includes means for adjusting the braking force.

4. The device of claim 1 further including weather panels detachably securable to said crossarms.

5. The device of claim 4 wherein said panels are quadrant shaped having dip means for detachably securing said panels to said crossarms.

6. The device of claim 1 wherein said bottom surface of said first and second pairs of cross arms define a plurality of recesses and said roller means are positioned within said recesses thereby maintaining a low profile.

* * * * *